United States Patent [19]

Anderson et al.

[11] 4,017,044
[45] Apr. 12, 1977

[54] TRAIN VEHICLE CONTROL APPARATUS

[75] Inventors: Larry W. Anderson; Michael P. McDonald, both of Pittsburgh, Pa.

[73] Assignee: Westinghouse Electric Corporation, Pittsburgh, Pa.

[22] Filed: Aug. 6, 1975

[21] Appl. No.: 602,491

[52] U.S. Cl. .................. 246/182 B; 246/182 C; 246/187 B

[51] Int. Cl.² .......................... B61L 3/24

[58] Field of Search ....... 246/182 R, 182 C, 182 B, 246/187 R, 187 B; 303/20, 21 EB, 21 CF; 324/161, 164; 317/5

[56] References Cited

UNITED STATES PATENTS

| | | | |
|---|---|---|---|
| 3,363,096 | 1/1968 | Hughson | 246/187 B |
| 3,457,403 | 7/1969 | Smith | 246/187 R |
| 3,870,378 | 3/1975 | Carp | 303/20 |
| 3,909,606 | 9/1975 | Shibata | 303/21 CF |

Primary Examiner—Trygve M. Blix
Assistant Examiner—Reinhard J. Eisenzopf
Attorney, Agent, or Firm—R. G. Brodahl

[57] ABSTRACT

A train vehicle zero speed sensing apparatus is provided for operation with a pair of tachometers coupled to the drive mechanism of a train vehicle, such that zero speed or an equivalent zero speed of the vehicle is sensed, and any single failure is detectable and will not yield a false zero speed indication.

8 Claims, 7 Drawing Figures

TRAIN VEHICLE CONTROL APPARATUS

BACKGROUND OF THE INVENTION

There is a need to determine when a train vehicle operative in an automated vehicle control system is moving at zero speed or at less than a predetermined zero equivalent speed, with a fail-safe or vital zero speed indication signal being provided as desired for train operation control purposes when the train vehicle is moving at less than such predetermined zero speed. A propulsion enable signal is provided when the actual speed of the train vehicle is less than the desired speed for that vehicle. When the actual speed of the vehicle is greater than the desired speed the propulsion enable signal is not provided and the full service brake will be applied. In addition when the train vehicle is detected to be positioned adjacent to a station platform, a door open enable signal is provided when the vehicle is sensed to be moving at less than a predetermined zero equivalent speed such as 0.1 mile per hour. The provision of the propulsion enable signal and the provision of the door open enable signal has to be in a substantially fail-safe manner.

The train vehicle has to be out of a full service brake condition of operation to move the train in response to a desired speed signal. In normal operation the train can be operating along a track divided into signaling blocks of respective predetermined lengths, with a very low impedance connection being made between the track rails at the ends of each such signal block. A signal transmitter is operative with one end of each signal block at one of several frequencies and a cooperative signal receiver is coupled with the other end of each signal block for controlling the operation of a train vehicle positioned within that signal block, such as described in U.S. Pat. No. Re. 27,472 and U.S. Pat. No. 3,532,877 of G. M. Thorne-Booth and in U.S. Pat. No. 3,593,022 of G. M. Thorne-Booth et al. A published article entitled "Automatic Train Control Concepts Are Implemented By Modern Equipment" by R. C. Hoyler in the September 1972 Westinghouse Engineer at pages 145 to 151 includes a disclosure of this operation.

A signal receiver carried by the train vehicle senses a desired speed coded signal from the signal block occupied by that vehicle, which desired speed signal the train decodes and provides a desired speed command signal to the propulsion control apparatus of the train vehicle to result in energizing the propulsion motors for regulating the actual speed to correspond with the desired speed of operation along the track and within a particular signal block. The actual speed of the vehicle is obtained from a pair of tachometers operative with the wheels of the vehicle as disclosed in U.S. Pat. No. 3,810,681 of T. C. Matty. If the actual speed of the train vehicle is too low, more propulsion effort for the vehicle is required and if the actual speed is too high then braking of the vehicle is provided.

SUMMARY OF THE INVENTION

According to the teachings of the present invention a train control apparatus is provided for sensing a zero speed condition of a train vehicle, with any sensing failure being detectable and not yielding a false zero speed indication. A pair of speed sensing tachometers are operative with the controlled train vehicle. When both tachometers are dynamic, with the vehicle moving, the outputs of the tachometers are established to be true and a vital or fail-safe propulsion enable signal permits the vehicle to continue moving. When both tachometers are static, the outputs of the tachometers are established to be static and the zero speed indication signal is provided. The train vehicle includes a door open control apparatus responsive to the zero speed indication signal to inhibit the vehicle doors from opening when the vehicle is moving faster than the predetermined equivalent zero speed. The train vehicle includes a propulsion and brake control apparatus responsive to the propulsion enable signal for removing the full service brake and to permit the vehicle propulsion motor to be energized when the desired speed of the vehicle is greater than the actual speed.

DESCRIPTION OF THE PREFERRED EMBODIMENT

Figure 1:
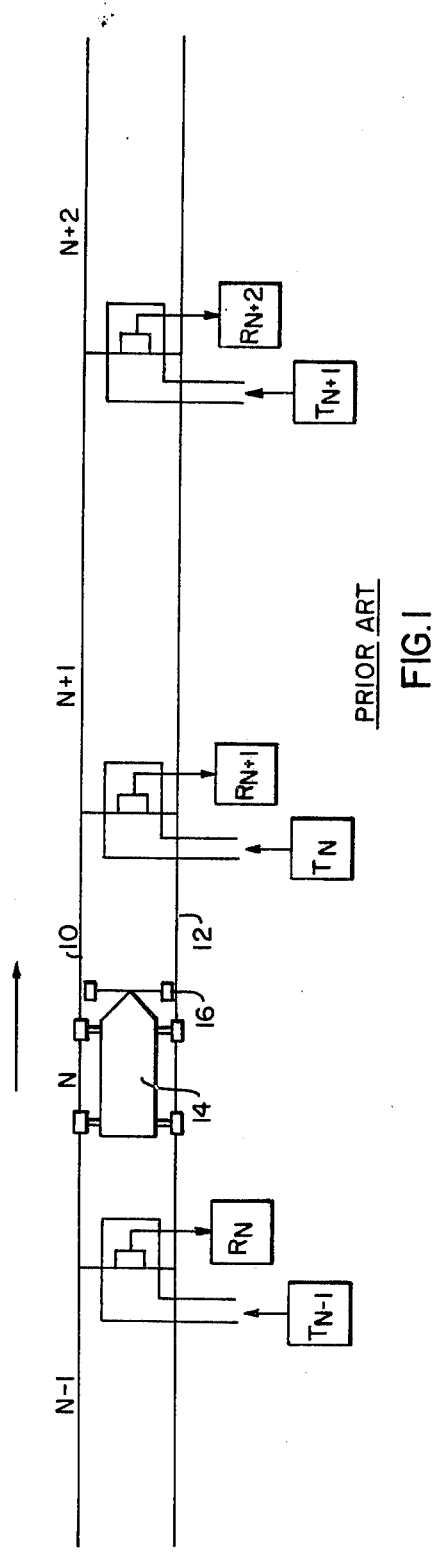
FIG. 1 is a schematic showing of a well-known track signal block arrangement operative with a train vehicle to be controlled.

In FIG. 1 there is shown a well-known track arrangement including rails 10 and 12 along which a train vehicle 14 moves in the direction indicated by the arrow. The train vehicle 14 includes speed signal receiving antenna 16 which is positioned above the rails and ahead of the front wheels. The track is shown divided into signal blocks N−1, N, N+1 and N+2 by low impedance members connected between the two rails 10 and 12 at the respective ends of each signal block. Each signal block is energized with a desired speed signal, such as signal block N receives a speed signal from transmitter $T_N$ coded in accordance with the desired speed for vehicle 14 traveling within the signal block N. A receiver $R_N$ is operative with the signal block N in relation to the determination by wayside equipment of the occupancy of signal block N by a train vehicle, for the purpose of controlling the entry of a subsequent train vehicle in relation to an already occupied signal block. The desired speed signal supplied to signal block N by the transmitter $T_N$ represents the maximum desired speed for the passage of a train vehicle through the signal block N.

Figure 2:
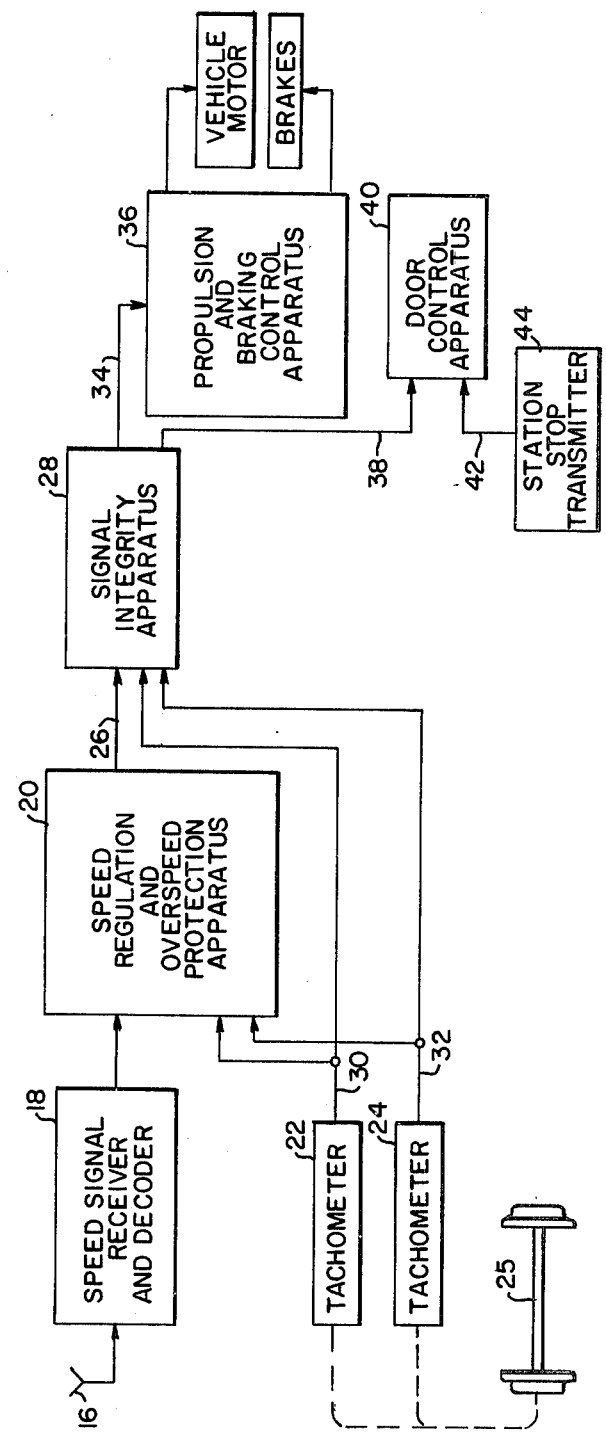
FIG. 2 is a schematic showing of a train vehicle control system, including signal integrity apparatus of the present invention.

In FIG. 2 there is shown the antenna 16 which is located on the vehicle and supplies the desired speed signal to the speed signal receiver and decoder 18 operative to filter, amplify, limit, demodulate and decode the desired speed signal in the signal block occupied by the train vehicle to be controlled. The desired speed is compared to the actual speed in a speed regulation and overspeed protection apparatus 20, with the actual speed being obtained from two tachometers 22 and 24 operative with an axle 25 of the train vehicle. If the actual speed is too low, additional propulsion effort is required. If the actual speed is too high, then braking of the vehicle is required. A vital NOT overspeed signal 26 is provided by the speed regulation and overspeed protection apparatus 20. As long as the actual speed of the vehicle is less than the desired speed, the signal 26 enables the propulsion motor to be energized for moving the vehicle along the track. If the actual speed becomes greater than the desired speed, the signal 26 causes the full service braking operation to occur. It should be understood that a suitable signal deadband can be included within which undesirable repetitive cycling between propulsion and braking is avoided. The signal 26 is supplied to a signal integrity apparatus 28 in which the NOT overspeed signal 26 is combined with the respective tachometer output signals 30 and 32 in a logic AND operation to provide a propulsion enable signal 34 in accordance with the NOT overspeed and the tachometer integrity functions. If one of the tachometers 22 or 24 should fail, the propulsion enable signal 34 is discontinued and this operates with the propulsion and braking control apparatus 36 to apply the full service brake for stopping the train vehicle.

A door open enable signal 38 is provided by the signal integrity apparatus 28 when the tachometers 22 and 24 indicate the vehicle axle speed is less than a predetermined equivalent zero speed. This door open enable signal 38 is supplied to door control apparatus 40 and operative in conjunction with the signal 42 from a station stop transmitter 44 when the train vehicle is positioned adjacent a station platform suitable for the loading and unloading of passengers.

Figure 3:
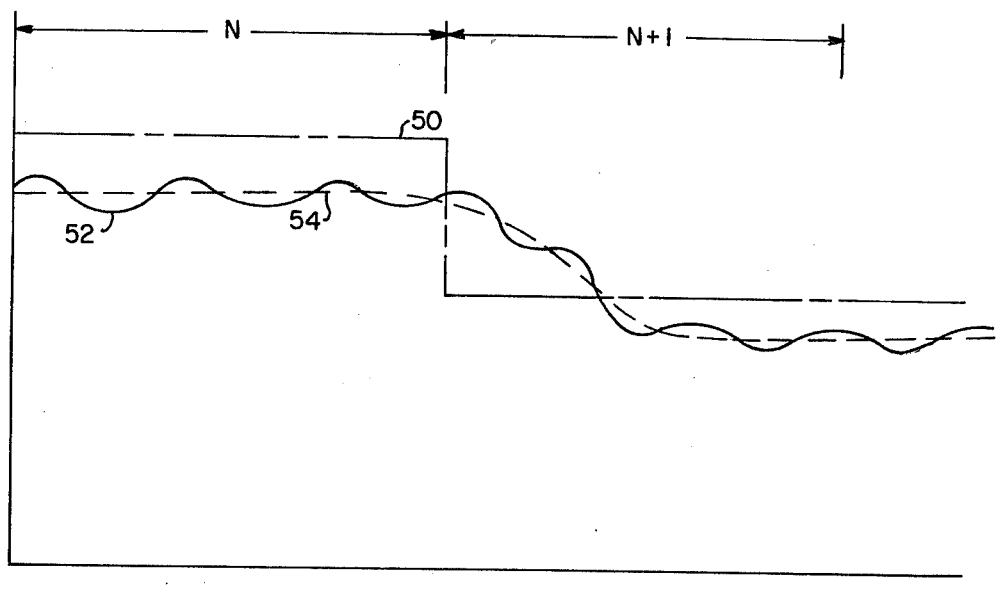
FIG. 3 is a graphical showing of vehicle operational speed relationships.

In FIG. 3 the curve 50 shows an illustrative desired speed for a train vehicle passing through a signal block N and the next adjacent signal block N+1. With the actual speed of a train vehicle operating in signal block N following the curve 52 slightly below the desired speed curve 50, and the average actual speed of the vehicle could be in accordance with curve 54. When the vehicle leaves signal block N and enters the next adjacent signal block N+1 having a reduced desired speed as shown by curve 50, the full service brake of the vehicle will be applied to slow down the vehicle as generally shown in FIG. 3 in relation to actual speed curve 52. Where the actual speed curve 52 is below the desired speed curve 50 the NOT overspeed signal 26 and the propulsion enable signal 34 would be provided and the propulsion motor of the vehicle would function to move the vehicle along the track. When the actual speed as shown by curve 52 is above the desired speed as shown by curve 50, the full service brake operation would occur, with the consideration as well known in this art that passenger comfort would be maintained in this regard.

Figure 4:
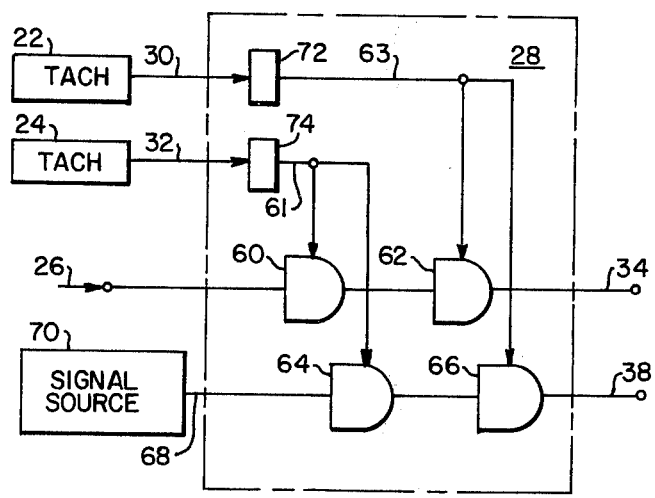
FIG. 4 is a schematic showing of the present signal integrity apparatus.

In FIG. 4 there is schematically shown the signal integrity apparatus 28 of FIG. 2. The NOT overspeed signal 26 is applied through AND gates 60 and 62, which AND gates are in accordance with the disclosure of U.S. Pat. No. 3,600,604 of G. M. Thorne-Booth. The gates 60 and 62 will pass the NOT overspeed signal 26 and provide the propulsion enable signal 34 when the control signals 61 and 63 respectively are negative in relation to a reference voltage. The similar gates 64 and 66 will pass the carrier signal 68 from the signal source 70 and provide the door open enable signal 38 when the control signals 61 and 63 respectively are positive in relation to reference voltage. The tachometer 22 is operative with a switching apparatus 72 for applying a control signal 63 to each of the gates 62 and 66. The tachometer 24 is operative with a switching apparatus 74 for applying a control signal 61 to each of the gates 60 and 64. The control signal 63 from switching apparatus 72 cannot simultaneously be positive and negative, and therefore an effective exclusive OR logic function is provided in conjunction with the gates 62 and 66, and the same functional operation applies for the control signal 61 from the switching apparatus 74 in conjunction with the gates 60 and 64. Both of the control signals 61 and 63 have to be negative to provide a signal path from the NOT overspeed signal 26 through the gates 60 and 62 to output the propulsion enable signal 34. Both of the control signals 61 and 63 have to be positive to provide a signal path from the carrier signal source 70 through the gates 64 and 66 to output the door open enable signal 38. At no time can signal paths be simultaneously provided respectively through the gates 60 and 62 for signal 34 and through the gates 64 and 66 for signal 38. When the control signal 61 is different than the control signal 63, with one positive and the other negative, neither of the output signals 34 and 38 will be provided at that time.

The tachometers 22 and 24 are operative with the same vehicle axle for maintaining a desired phase relationship between their respective output signals 30 and 32 as disclosed in U.S. Pat. No. 3,810,681 of T. C. Matty. The signal 30 and the signal 32 can only be negative if the associated tachometer is dynamic and properly phased in relation to the dynamic second tachometer, and any operational failure either in the associated switching apparatus, physically in each tachometer or in the relative phasing of the two tachometers will result in signal 61 and signal 63 not being negative. With the train vehicle moving in the forward direction a predetermined phase relationship, for example leading, is provided and sensed by the signal integrity apparatus 28 shown in FIG. 4.

Figure 5:
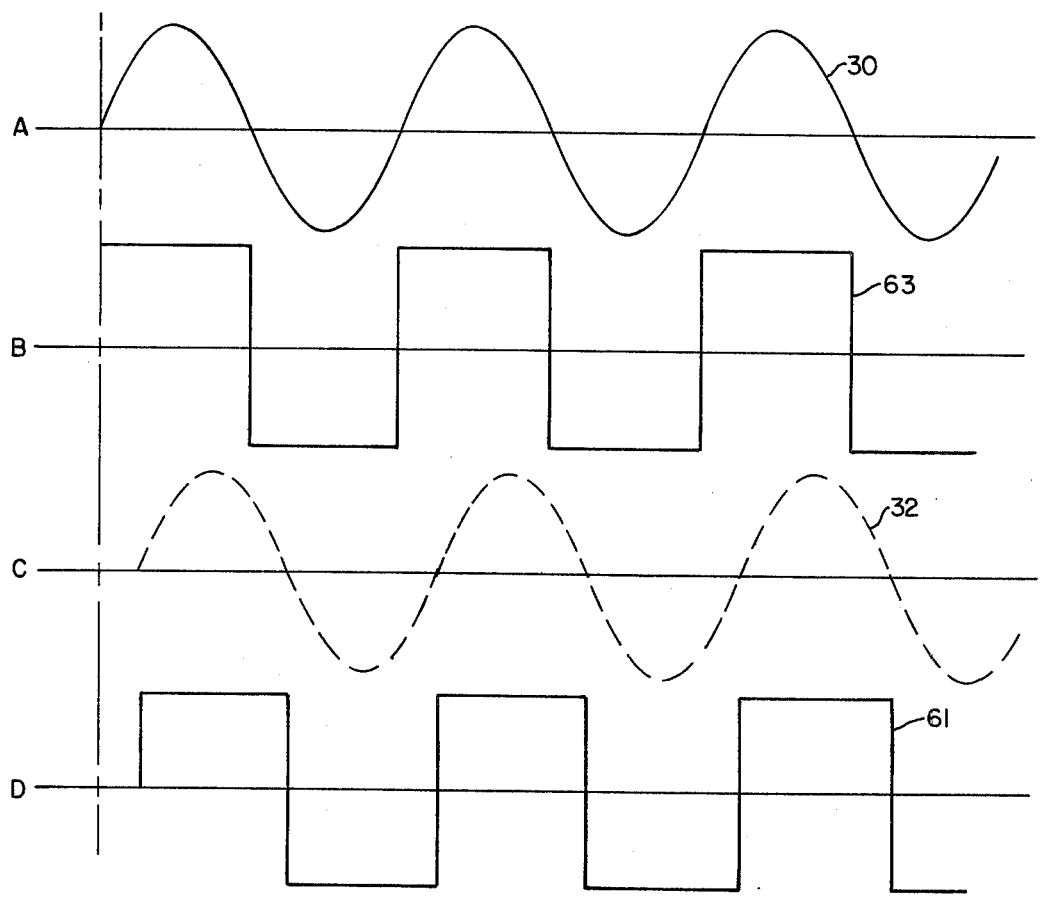
FIG. 5 illustrates the respective tachometer apparatus output signals.

In FIG. 5 there are shown signal waveforms to illustrate the output signals from the tachometers 22 and 24 and the switching circuits 72 and 74. The curve 5a shows the sinusoidal waveform of signal 30 from the variable reluctance tachometer 22. The curve 5b shows the square waveform of signal 63 from the schmidt trigger switching circuit 72. The curve 5c shows the 90° phase shifted sinusoidal waveform of signal 32 from the variable reluctance tachometer 24 and the curve 5d shows the square waveform of signal 61 from the schmidt trigger switching circuit 74.

Figure 6:
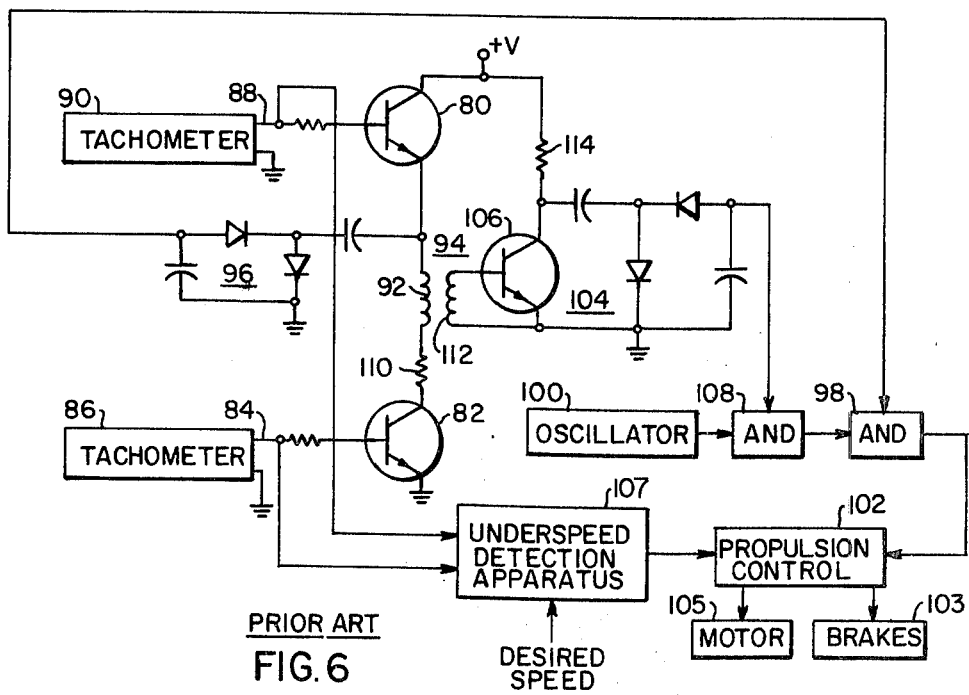
FIG. 6 is a schematic showing of prior art train vehicle braking control apparatus.

In FIG. 6 there is shown the vehicle movement sensing apparatus disclosed in U.S. Pat. No. 3,810,681 of T. C. Matty. The square wave signal 84 from the tachometer 86, which can include a square wave generating switching circuit, is 90° in phase ahead of the square wave signal 88 from the tachometer 90 for a forward direction movement of the train vehicle. When the signal 84 from tachometer 86 becomes positive, the transistor 82 becomes conducting but the transistor 80 is still not conducting, and therefore no current path is provided from the source +V to ground through the primary winding 92 of the transformer 94. Thusly, the detector circuit 96 detects no signal and provides a zero volt signal to the AND gate 98 such that the AND gate 98 does not provide a path for a signal from oscillator 100 to be applied to the propulsion control 102. In addition the detector circuit 104 senses no signal from transistor 106 and provides a zero volt signal to the AND gate 108 which does not provide a path through the AND gate 108 to provide a signal from the oscillator 100 to the propulsion control 102. The AND gates 98 and 108 are in accordance with the disclosure of U.S. Pat. No. 3,600,604 of G. M. Thorne-Booth, where a negative signal is required to enable the AND gate to pass the periodic signal from the oscillator 100 to the propulsion control 102.

When the signal 88 from the tachometer 90 becomes positive which occurs 90° in phase after the signal 84 became positive, the transistor 80 becomes conductive and since both transistors 80 and 82 are now conductive current flows from the source +V through the primary winding 92 and limiting resistor 110 to circuit ground. The detector circuit 96 still does not apply a negative signal to enable AND gate 98 to pass the signal from oscillator 100 to the propulsion control 102. When the signal 84 returns to a zero voltage and the transistor 82 becomes not conducting to remove the current path from the source +V through the primary winding 92, this results in the magnetic field of transformer 94 collapsing and voltage is induced in the secondary winding 112. This induced voltage increase across the secondary winding causes the transistor 106 to conduct and current then flows from the source +V through the resistor 114 to circuit ground which causes the collector electrode of transistor 106 to go to essentially ground potential. The detector circuit 104 now provides a negative signal to AND gate 108 for enabling the latter gate to pass the signal from oscillator 100 to the propulsion control 102. The AND gate 98 is not enabled at this time so the propulsion control is not energized. When the signal 88 from tachometer 90 again returns to zero voltage, the transistor 80 becomes not conducting, the emitter electrode of transistor 80 returns to a zero volt level causing the detector circuit 96 to provide a negative signal to enable the AND gate 98 and permits the signal from oscillator 100 to reach the propulsion control 102. The propulsion control 102 is now operative such that the vehicle brakes 103 are not applied at this time and the vehicle motor 105 is permitted to continue movement of the vehicle along the track in a forward direction. The enable signals provided to the AND gates 98 and 108 remain at negative voltage levels, since the time constants of the detector circuits 96 and 104 respectively are chosen to maintain these enable signals as such for as long as the signals 84 and 88 from the tachometers 86 and 90 occur repetitively as shown in FIG. 5. Due to the coupling of transformer 94, if the phase relationship of the signals 84 and 88 from the respective tachometers 86 and 90 is reversed and the signal 84 becomes positive 90° in phase after the signal 88, the transistor 82 is turned on before the transistor 80 and the polarity of the signal at the secondary 112 of transformer 94 will not turn on the transistor 106. If one of the tachometers should fail and go static, transistor 106 will remain static and the negative enabling signal to AND gate 108 is no longer provided, or if the vehicle moves in a reverse direction, the control signal from oscillator 100 is no longer provided to the propulsion control 102 and this causes the application of the brakes 103 by the propulsion control 102. The underspeed detection apparatus 107 compares the decoded desired speed for the train vehicle with the actual speed as sensed by the tachometers 86 and 90. If the actual speed is less than the desired speed, the propulsion control is operated to cause the motor 105 to accelerate the train vehicle. If the actual speed is greater than the desired speed, the propulsion control 102 is operated to cause the brakes 103 to be applied. If the signal to the propulsion control 102 from the AND gates 98 and 108 is not provided, the brakes 103 will be applied. The operation of the underspeed detection apparatus 107 and the propulsion control 102 is well known to persons skilled in this art.

In reference to the signal integrity apparatus 28 shown in FIG. 4, the two vital direct current signals 30 and 32 are provided by the respective tachometers 22 and 24. If either of the two signals 30 and 32 should fail and not be provided for any reason, the full service brakes of the vehicle will be applied. The propulsion enable signal 34 is provided when the AND gates 60 and 62 are enabled by each of the respective signals 61 and 63 being negative. When the vehicle stops, the signal from signal source 70 is passed through to the output 38 when the AND gates 64 and 66 are enabled by the respective signals 61 and 63 each being positive. A positive bias voltage is included in each switching circuit 72 and 74 to make the respective signals 61 and 63 positive when the train vehicle stops. If the input signal 30 applied to switching circuit 72 is a negative voltage, the output signal 63 will be negative, and if the input signal 30 applied to switching circuit 72 is zero volts, the output signal 63 will be the positive supply voltage operative with the switching circuit 72.

Figure 7:
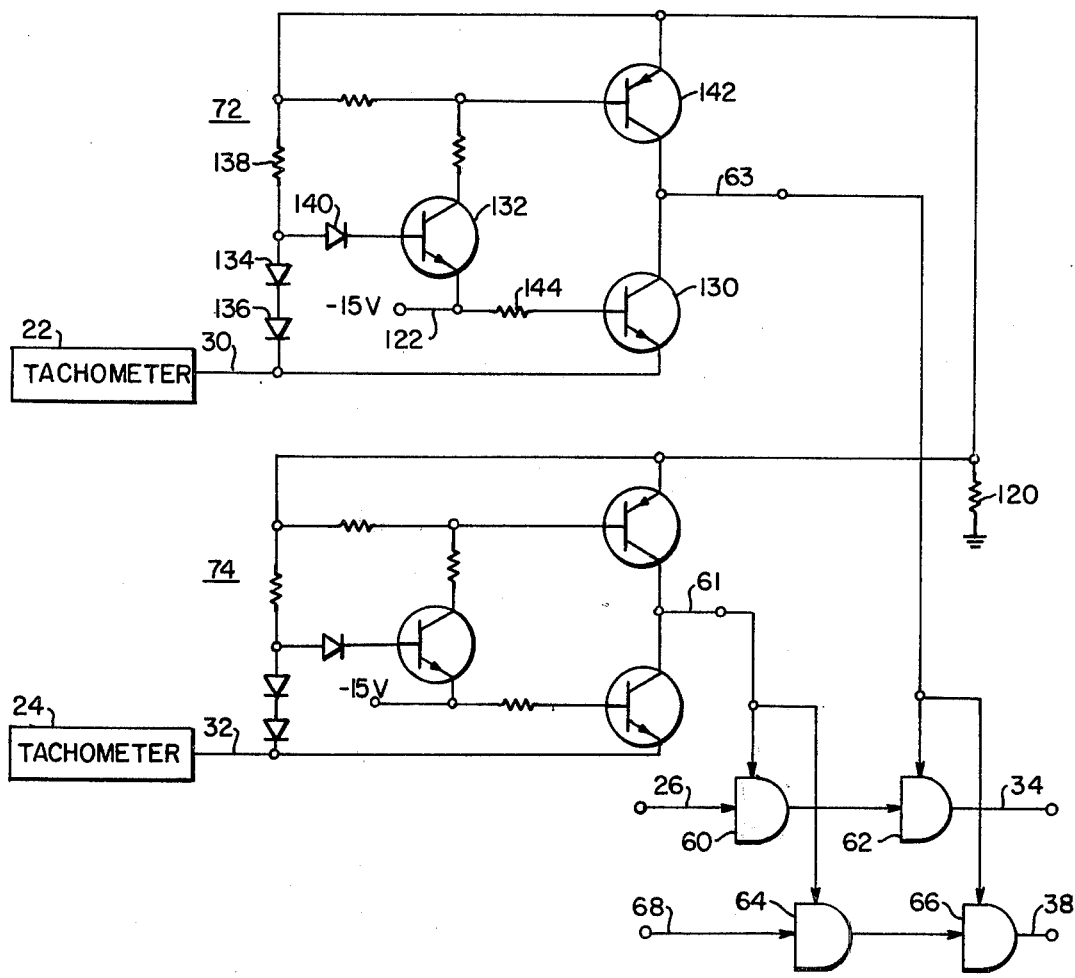
FIG. 7 is a schematic showing of the switching circuits included in FIG. 4.

In FIG. 7 there is schematically shown the switching circuits 72 and 74. Any failure in relation to the provision of the input signal 30 by the tachometer 22 cannot provide an output signal from the circuit 72 that is more negative than the vital direct current input signal 30, because the signal 30 is the source of any negative output signal 63 from the switching circuit 72. The ground reference 120 and the positive voltage supply are in relation to the most negative volt power supply in the circuit of FIG. 7, which is minus 15 volts. Thusly, the vital direct current output signal 63 becomes the most negative signal in the control system, and a failure of power supply 122 does not remove the desired fail-safe train vehicle control operation. In the operation of the switching circuit 72 shown in FIG. 7 the power supply 122 is the reference voltage, with a positive or a negative output signal 63 being in relation to the reference voltage of power supply 122. When the vehicle is moving in the proper direction the output signal 63 is negative. In the event of a failure of tachometer 22 or a tachometer detection circuit failure such that input 30 falls to a zero voltage level, the switching circuit 72 will switch that zero voltage level to a positive output signal 63. The operation of the switching circuit 74 is similar in relation to the input signal 32 from the tachometer 24.

With the train vehicle moving in the proper direction each of the vital direct current signals 61 and 63 shown in FIG. 4 will be negative and the transfer gates 60 and 62 now provide a path for the provision of the propulsion enable signal 34. If a failure condition occurs in relation to vital direct current signal 61, such that this signal now goes positive, the transfer gate 64 is enabled in addition to transfer gate 62 being enabled which results in not providing a zero speed enable signal 38 because the transfer gate 66 is blocking and in not providing the propulsion enable signal 34 because the transfer gate 60 is blocking. Thusly, the train vehicle will stop and the doors will not open.

With the known prior art apparatus a failure of just one vital DC signal was not detectable. The present apparatus does detect such a failure of one vital DC signal and that failure has to be corrected before the train vehicle can run along the track. This provides the desired vital zero speed detection.

A typical voltage doubler such as the detector circuits 96 and 104 shown in FIG. 6 is a capacitor pump circuit with a dynamic input having two charging capacitors. One switch when turned off allows one capacitor charge and when that same switch is turned on it references that one capacitor to zero volts and transfers its charge to the second capacitor. A negative voltage is thereby developed across the second and output capacitor.

The switching apparatus 72 and 74 as shown in FIG. 7 is referenced to minus 15 volts. The plus signal is established at about minus 10 volts. When the first tachometer 22 input is at minus 15 volts, the transistor 130 will turn off because it has minus 15 volts on the base and minus 15 volts on the emitter. The transistor 132 turns on since no current is flowing through the diode drops 134 and 136 and the resistor 138 goes to line voltage with the voltage at the anode of the diode 140 and the voltage drop across the base emitter junction of the transistor 132 being about 1.2 volts above the minus 15 volts so the transistor 132 will turn on. When the transistor 132 turns on, this turns on the transistor 142 which connects the minus 10 volts positive voltage to the output 63 going to the transfer gates 62 and 66. When the signal 30 is at minus 15 volts, which is the reference voltage, the transfer gate 62 is enabled. The transfer gate 66 is not enabled because it has reverse polarity applied to its control line. When signal 30 goes negative, this pulls the base of transistor 132 negative with respect to its emitter, which turns off the transistor 132 and this in turn turns off the transistor 142 to disconnect the plus power supply. Also the emitter of the transistor 130 is pulled negative with respect to minus 15 volts, with the resistor 144 being a base current limit, to turn on the transistor 142.

Thusly, before the propulsion enable signal 34 is provided both of the tachometers 22 and 24 have to be operating in a dynamic state with the vehicle moving, and before the zero speed or door open enable signal 38 is provided both of the tachometers 22 and 24 have to be in a static state with the vehicle stopped or at the equivalent of a zero speed.

We claim:

1. In control apparatus responsive to the movement of a train vehicle, the combination of:
    means operative with said train vehicle for providing a first speed signal having a first polarity when said train vehicle is moving in a predetermined direction at a speed greater than a predetermined zero speed and having a second polarity when said train vehicle is not moving in said direction at greater than said predetermined zero speed,
    means operative with said train vehicle for providing a second speed signal having said first polarity when said train vehicle is moving at a speed greater than said predetermined zero speed and having said second polarity when said train vehicle is not moving at greater than said predetermined zero speed, and
    means for providing a vehicle control signal in response to each of said first speed signal and said second speed signal having said first polarity.

2. The control apparatus of claim 1, with said first polarity being negative when said train vehicle is moving in said predetermined direction at a speed greater than said predetermined zero speed and with said second polarity being positive when said vehicle is moving in one of a different direction or in said predetermined direction at a speed less than said predetermined zero speed.

3. The control apparatus of claim 1, with said first vehicle control signal being operative to control the propulsion of said vehicle when both of said first and second speed signals have said first polarity and being operative to control the braking of said vehicle when at least one of said first and second speed signals has said second polarity.

4. The control apparatus of claim 1, with said vehicle control signal providing means including a pair of logic devices responsive to said first polarity of the respective first and second speed signals.

5. The control apparatus of claim 1, with said first speed signal providing means including a signal switching apparatus for providing an output of said first polarity when said train vehicle is moving in said predetermined direction at a speed greater than said predetermined zero speed and for otherwise providing an output of said second polarity.

6. The control apparatus of claim 1, with said vehicle control signal being provided when each of said first speed signal and said second speed signal has said first polarity.

7. The control apparatus of claim 1, including means for providing a second vehicle control signal in response to each of said first speed signal and said second speed signal having said second polarity.

8. In control apparatus responsive to the movement of a train vehicle, the combination of:
    means responsive to the movement speed of said train vehicle for providing at least two output signals in accordance with said speed,
    means responsive to one of said output signals for providing a first speed signal having a first polarity when said vehicle is moving in a first direction at an actual speed greater than a predetermined zero speed and having a second polarity when said vehicle is not moving at an actual speed greater than said predetermined zero speed,
    means responsive to another of said output signals for providing a second speed signal having said first polarity when said vehicle is moving in said first direction at an actual speed greater than said predetermined zero speed and having said second polarity when said vehicle is not moving at an actual speed greater than said predetermined zero speed,
    means for providing a first vehicle control signal in response to each of said first speed signal and said second speed signal having said first polarity, and
    means for providing a second vehicle control signal in response to each of said first speed signal and said second speed signal having said second polarity.

* * * * *